United States Patent
Silva

(10) Patent No.: US 11,336,808 B2
(45) Date of Patent: May 17, 2022

(54) ROOF ANTENNA OF A VEHICLE HAVING A REVERSING CAMERA

(71) Applicant: Hirshmann Car Communication GmbH, Neckartenzlingen (DE)

(72) Inventor: David Silva, Nurtingen (DE)

(73) Assignee: Hirschmann Car Communication GmbH, Neckartenzlingen (DE)

( * ) Notice: Subject to any disclaimer, the term of this patent is extended or adjusted under 35 U.S.C. 154(b) by 0 days.

(21) Appl. No.: 16/944,112

(22) Filed: Jul. 30, 2020

(65) Prior Publication Data

US 2020/0366821 A1   Nov. 19, 2020

Related U.S. Application Data

(63) Continuation of application No. PCT/EP2019/052219, filed on Jan. 30, 2019.

(30) Foreign Application Priority Data

Jan. 30, 2018   (DE) ......................... 10 2018 101 992

(51) Int. Cl.
   *B60R 11/02*   (2006.01)
   *B60R 11/04*   (2006.01)
   *H01Q 1/12*   (2006.01)
   *H01Q 1/32*   (2006.01)
   (Continued)

(52) U.S. Cl.
   CPC ........... *H04N 5/2257* (2013.01); *B60R 11/02* (2013.01); *B60R 11/04* (2013.01); *H01Q 1/1214* (2013.01); *H01Q 1/3275* (2013.01); *H04N 5/2253* (2013.01); *H04N 5/2254* (2013.01); *H04N 5/22521* (2018.08); *B60R 2011/004* (2013.01); *B60R 2011/005* (2013.01); *B60R 2011/0064* (2013.01)

(58) Field of Classification Search
   None
   See application file for complete search history.

(56) References Cited

U.S. PATENT DOCUMENTS

| | | | |
|---|---|---|---|
| 2015/0307026 A1* | 10/2015 | Minikey, Jr | A61B 8/085 348/148 |
| 2016/0315379 A1* | 10/2016 | Silva | H01Q 1/1214 |
| 2018/0261912 A1* | 9/2018 | Mizuno | H01Q 1/32 |

FOREIGN PATENT DOCUMENTS

| | | |
|---|---|---|
| JP | 2005193733 A | 7/2005 |
| JP | 2016116048 A | 6/2016 |
| WO | 2017046971 A1 | 3/2017 |

OTHER PUBLICATIONS

PCT Search Report and Written Opinion, dated Apr. 24, 2019, 10 pages.

* cited by examiner

*Primary Examiner* — Patricia I Young
(74) *Attorney, Agent, or Firm* — Barley Snyder

(57) ABSTRACT

A roof antenna includes a base plate, an outer cover, an inner cover arranged under the outer cover and connected to the base plate, and a fastening device on the base plate arranging and fastening the roof antenna at an intended installation location. The inner cover accommodates at least one antenna element for receiving and/or transmitting high-frequency signals that is arranged on the base plate. The roof antenna includes a camera arranged under the outer cover and accommodated inside the inner cover. At least one of the outer cover and the inner cover has an opening for a recording field of the camera.

16 Claims, 1 Drawing Sheet

(51) Int. Cl.
*H04N 5/225* (2006.01)
*B60R 11/00* (2006.01)

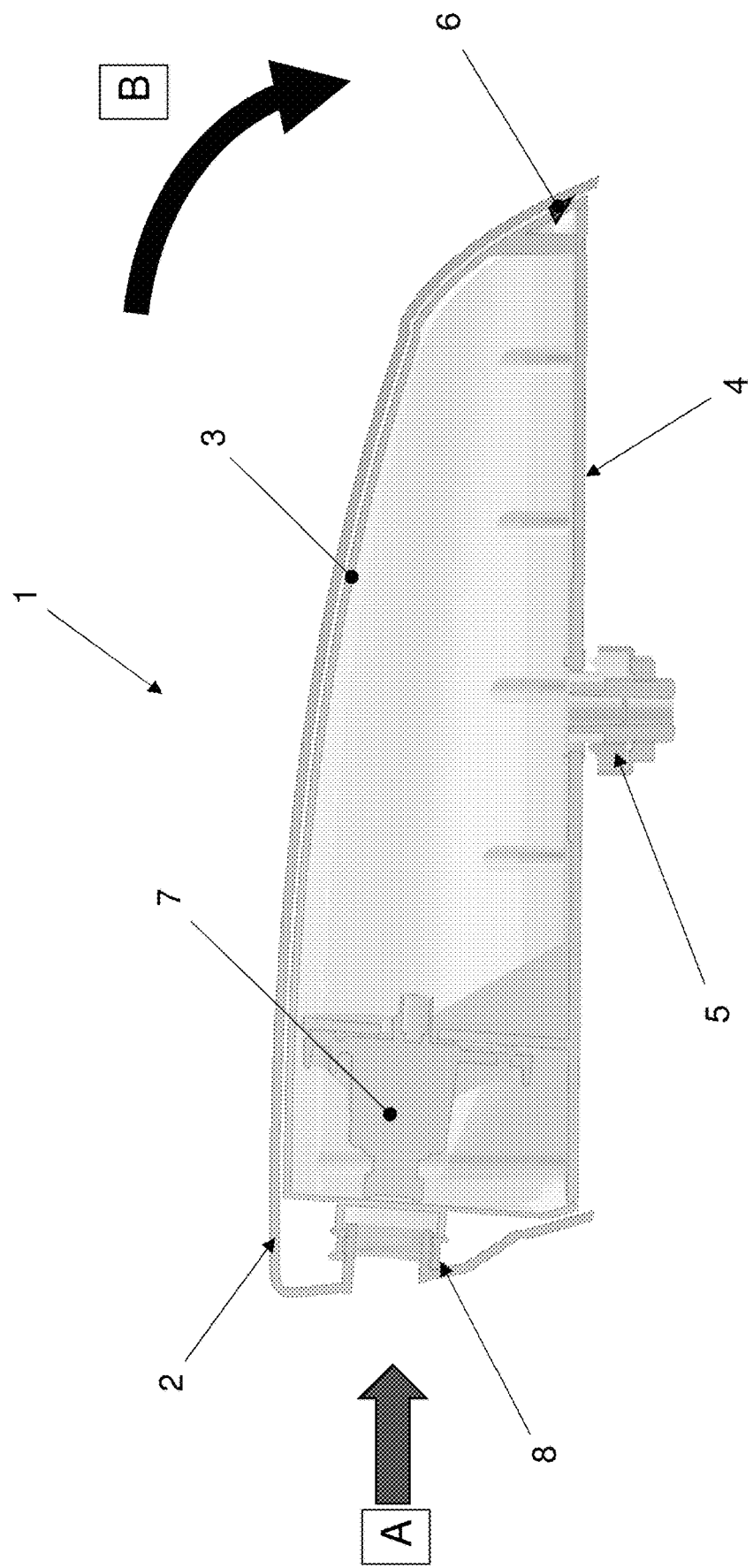

ROOF ANTENNA OF A VEHICLE HAVING A REVERSING CAMERA

CROSS-REFERENCE TO RELATED APPLICATIONS

This application is a continuation of PCT International Application No. PCT/EP2019/052219, filed on Jan. 30, 2019, which claims priority under 35 U.S.C. § 119 to German Patent Application No. 102018101992.0, filed on Jan. 30, 2018.

FIELD OF THE INVENTION

The present invention relates to an antenna and, more particularly, to a roof antenna of a vehicle.

BACKGROUND

A roof antenna of a vehicle, as disclosed in German Patent Application No. DE 10 2015 210 449 B4, has a base plate and at least one antenna element for receiving and/or transmitting high-frequency signals arranged on the base plate and accommodated under a cover which is operatively connected to the base plate. The base plate has fastening devices for arranging and fastening the roof antenna to its intended installation location. The roof antenna has a camera arranged under the cover and the cover has an opening for the recording field of the camera.

With this roof antenna, water can accumulate in the interior of the roof antenna, or inside the cover, if the cover is not watertight or if there is no sealing connection between the cover and the base plate of the roof antenna, or supporting surface, on which the roof antenna is mounted (vehicle roof). In particular at low temperatures (below 0° C.), the roof antenna can be destroyed by frost. However, even at temperatures above this, the functionality of the roof antenna is impaired due to water or moisture (condensate) which has intruded.

SUMMARY

A roof antenna includes a base plate, an outer cover, an inner cover arranged under the outer cover and connected to the base plate, and a fastening device on the base plate arranging and fastening the roof antenna at an intended installation location. The inner cover accommodates at least one antenna element for receiving and/or transmitting high-frequency signals that is arranged on the base plate. The roof antenna includes a camera arranged under the outer cover and accommodated inside the inner cover. At least one of the outer cover and the inner cover has an opening for a recording field of the camera.

BRIEF DESCRIPTION OF THE DRAWINGS

The invention will now be described by way of example with reference to the accompanying FIGURE, of which:

The FIGURE is a sectional side view of a roof antenna according to an embodiment.

DETAILED DESCRIPTION OF THE EMBODIMENT(S)

In the following, the invention is explained in greater detail with reference to the accompanying drawing, in which an exemplary embodiment is shown.

A roof antenna 1 according to an embodiment is shown in the FIGURE. The roof antenna 1 is arranged at and attached to an appropriate part of the bodywork of the vehicle. In an embodiment, the roof antenna 1 is attached to a roof of the vehicle. In other embodiments, the roof antenna 1 could alternatively be connected to other parts of the bodywork of the vehicle.

The roof antenna 1, as shown in the FIGURE, has an outer cover 2 which forms the outer profile of the roof antenna 1. In the case of this exemplary embodiment, the outer cover 2 is painted with a specifiable geometry and in a desired car color. An inner cover 3 is arranged inside the outer cover 2, this inner cover 3 being made of a transparent material, in particular a polycarbonate in an embodiment.

The roof antenna 1, as shown in the FIGURE, has a base plate 4 on which a fastening device 5 is arranged. If required, the fastening device 5 can also be configured detached from the base plate 4. Via an underside of the base plate 4, the roof antenna 1 is placed at a desired installation location and is arranged and fixed permanently releasably or non-releasably on, for example, the roof of the vehicle with the fastening device 5.

The fixing of the outer cover 2 to the transparent inner cover 3 is carried out by a latching device 6, which is depicted by way of example. Alternatively or additionally, the two covers 2, 3 can be glued, caulked, welded or the like to one another.

As shown in the FIGURE, a camera 7 and further elements of the roof antenna 1, such as in particular antenna elements and the like, are arranged on a surface of the base plate 4 that faces away from a supporting surface of the base plate 4. The antenna element can be used for receiving and/or transmitting high-frequency signals. Furthermore, additional elements such as plug connectors, cables, and the like are present.

The camera 7 can look through an appropriately formed opening in the outer cover 2. A simple opening can be provided in the outer cover 2 for this purpose. A recording field of the camera 7 is able to be outwardly recorded (i.e. outside the cover of the roof antenna 1) by the camera 7. In an embodiment, the camera 7 is a reversing camera as a parking aid.

To enlarge the recording field of the camera 7, a lens can be arranged in this opening in the outer cover 2 for example, with this lens being inserted into the opening and fixed there by a seal 8, for example, or by other engagement or adhesion.

In an embodiment, both the inner cover 3 and the outer cover 2 have corresponding openings, which, in terms of their size, conform to the recording field of the camera 7. Thus, the main part, for example, of the camera 7 can be arranged inside the inner cover 3, whereas the lens or an objective of the camera 7 is guided outwards through these two openings in the covers 2, 3. It is also conceivable that the camera 7 or the lens or objective thereof is guided out of the inner cover 3 through the opening in the inner cover 3, but does not reach into the region of the opening in the outer cover 4, which is covered by a see-through protective cap. In such a case, the camera 7 is arranged inside the inner cover, protected from external influences, but at the same time can also look out through the outer cover 2 through the see-through protective cap.

In another embodiment, the inner cover 3 is formed by a transparent material and does not have an opening for the recording field of the camera 7. In this case, no opening for the recording field is required in the inner cover 3, since the camera 7 or the lens or objective thereof can look through the transparent material of the inner cover 3. As a result, the inner cover 3 can be manufactured as a one-piece component and the introduction of an opening in the inner cover 3 is omitted. Furthermore, the inner cover 3 as a standard inner cover too, can also optimally be configured at the installation location of the roof antenna 1 on the roof of the vehicle, with regard to its sealing effect in cooperation with the base plate 4 and/or the supporting surface.

In an embodiment, the seal 8 is integrally formed by the outer cover 2 and/or the inner cover 3. Depending on the embodiment of the roof antenna 1, in particular regarding whether the inner cover 3 is made of a transparent or non-transparent material, the seal 8 of the respective cover is designed differently with regard to the camera 7. Firstly, it is in principle conceivable that the seal 8, for example an O-ring, is a separate component. However, in another embodiment, the seal 8 is formed integrally by the outer cover 2 and/or the inner cover 3. This can be accomplished by the outer cover 2 and/or the inner cover 3 being made of a plastics material and being able to be manufactured in an appropriate method, in particular a plastics injection-molding method. In the case of the plastics injection-molding method, to produce the respective cover per se and also the integral configuration of the seal 8, it is possible to conceive of a two-component injection-molding method, with the material of the actual cover 2, 3 being made of a hard plastics material, whereas the seal 8 is formed from a material which is soft in comparison.

In an embodiment, it is possible to dispense with the seal 8 between the outer cover 2 and the camera 7, in particular its lens or objective, which means that it is only necessary to make, in the outer cover 2, an opening which either ends at the outer profile of the camera 7 or is selected to be somewhat larger. Such a configuration of an opening in the seal 8 described with the arrangement is a possibility if the inner cover 3 is made of a non-transparent material. However, it may also be a possibility if the material of the inner cover 3 is transparent.

In the exemplary embodiment depicted in the FIGURE, due to an appropriate shaping around the opening in the outer cover 2 and a corresponding shaping of the inner cover 3, a guiding and fixing of the outer cover 2 to the inner cover 3 is accomplished by a particular mounting sequence which shall be described hereafter.

First, the base plate 4 is provided, and is equipped with the camera 7, the at least one antenna element and, if required, further elements. After this has been carried out, the transparent inner cover 3 is mounted, this mounting being carried out on the base plate 4 in a sealing manner, in order to close the space surrounded by the base plate 4 and the inner cover 3, in a manner which gives protection against penetration by water, moisture, dust particles, other contaminants and the like. A circumferential lower edge of the inner cover 3 is arranged in a sealing manner at the circumferential edge of the base plate 4. As a result of this, the sealing effect is obtained in a certain region, which is the separated region of the inner cover 3 and the base plate 4, before these two elements have been mounted together as intended. The seal between the circumferential lower edge of the inner cover 3 and the circumferential edge of the base plate 4 can be accomplished by a press fit, by adhesion, by interposing a seal and the like, for example.

Because the base plate 4 rests on the bodywork surface (in particular the vehicle roof) of the vehicle, with a further sealing element interposed in an embodiment, the region of the fastening device 5, in which plugs or ducts of cables are provided, is protected in a sealing manner against external influences.

After this significant part of the roof antenna 1 has been prepared, it can be arranged at and fixed to its installation location without the outer cover 2 or even already with the outer cover 2. The mounting of the outer cover 2 takes place in the depicted mounting sequence A and B in the FIGURE.

In a first step A, the outer cover 2 is put in place, by its end which is situated opposite the end in the region of the latching device 6, in the region of the seal 8, wherein the end protrudes upwards in the region of the latching device 6 for example roughly at an angle of 45° (or smaller or larger, if required). If, as a result of the corresponding geometry of the abutment profiles of the outer cover 2, this is fixed in the region of the seal 8, guided on the inner cover 3, the outer cover 2 can be pivoted downwards in the second mounting step B, wherein one end of the outer cover 2 approaches the region of the latching device 6 and ultimately latches in its final position there shown in the FIGURE.

Thereafter, the outer cover 2 is in its intended position and encloses the inner cover 3, which is situated underneath it. If required, it is possible to conceive of the circumferential lower edge of the outer cover 2, in the final position, sealingly coming to bear on the outer profile of the circumferential lower edge of the inner cover 3 and/or of the surface of the bodywork surface of the vehicle.

The roof antenna 1 according to the invention integrates the camera 7, such as a reversing camera for a parking aid, into the roof antenna 1. The transparent cover 3 does not impair the view of the camera 7 while protecting it and other electronic elements from penetration by water from outside (for example rain water), and also from the formation of condensation. The seal 8 further prevents penetration. The view of the camera 7 is not impaired by the outer cover 2, because there is a cut-out in the outer cover 2 in the region of the lens (or over a larger region).

The inner cover 3 can be configured as a standard inner cover, which can be efficiently manufactured in very large quantities, regardless of the outer design and the desired color of the roof antenna 1. The outer design and the desired color can therefore be implemented with the outer cover 2. Moreover, it is not necessary for the outer cover 2 of the roof antenna 1 to seal off the elements situated underneath it, such as the camera 7, the antenna elements and, where necessary, additional elements, from external influences, because this is done by the inner cover 3 which can be optimized regarding this sealing function. The external design and the color (and further design features, if necessary) can thus be individually considered for each vehicle type by the outer cover 2.

What is claimed is:

1. A roof antenna, comprising:
a base plate;
an outer cover having an opening defined by a cylindrical wall extending in an inward direction;
an inner cover arranged under the outer cover and connected to the base plate, the inner cover having a cylindrical wall extending in an outward direction and receiving the cylindrical wall of the outer cover, the inner cover accommodates at least one antenna element for receiving and/or transmitting high-frequency signals that is arranged on the base plate;
a fastening device on the base plate arranging and fastening the roof antenna at an intended installation location;

a camera arranged under the outer cover and accommodated inside the inner cover, a recording field of the camera aligned with the cylindrical walls of the outer cover and the inner cover;

a lens arranged within the cylindrical wall of at least one of the inner cover and the outer cover; and an annular O-ring seal arranged over the cylindrical wall of the outer cover and abutting an outward facing surface of the cylindrical wall of the inner cover.

2. The roof antenna of claim 1, wherein the inner cover has the opening aligned with the cylindrical wall of the inner cover for the recording field of the camera.

3. The roof antenna of claim 1, wherein the inner cover is formed by a transparent material.

4. The roof antenna of claim 3, wherein the inner cover does not have the opening for the recording field.

5. The roof antenna of claim 2, wherein the seal is arranged between an outer periphery of the lens and an outer periphery of the opening in the inner cover.

6. A roof antenna, comprising:

a base plate;

an outer cover;

an inner cover arranged under the outer cover and connected to the base plate, the inner cover accommodates at least one antenna element for receiving and/or transmitting high-frequency signals that is arranged on the base plate;

a fastening device on the base plate arranging and fastening the roof antenna at an intended installation location;

a camera arranged under the outer cover and accommodated inside the inner cover, at least one of the outer cover and the inner cover has an opening for a recording field of the camera;

a lens arranged within the opening in at least one of the inner cover and the outer cover; and a latching device selectively securing the outer cover to the inner cover, the outer cover is installable onto the inner cover by fitting a first end of the outer cover proximate the lens onto a corresponding end of the inner cover with a second end of the outer cover proximate the latch arranged upwards at an angle relative to the inner cover, with the outer cover fixed to the inner cover on the first end thereof, the second end of the outer cover is pivotable in a downward direction under the guidance of the inner cover to a final position wherein the latching device secures the outer cover to the inner cover.

7. The roof antenna of claim 1, wherein a circumferential lower edge of the inner cover is arranged in a sealing manner at a circumferential edge of the base plate.

8. The roof antenna of claim 3, wherein the transparent material is a polycarbonate.

9. The roof antenna of claim 1, wherein the outer cover is attached to the inner cover by a latching device.

10. The roof antenna of claim 6, wherein the outer cover has an opening defined by an annular wall, the annular wall of the outer opening extending inward in a direction toward the camera.

11. The roof antenna of claim 10, wherein the inner cover has an opening defined by an annular wall, the annular wall of inner opening extending outward in a direction away from the camera.

12. The roof antenna of claim 11, wherein the annular wall of the outer cover extends into the annular wall of the inner cover.

13. The roof antenna of claim 12, wherein a seal is arranged over the annular wall of the outer cover and abuts an outward facing end of the annular wall of the inner cover.

14. The roof antenna of claim 13, wherein the lens is arranged within the annular wall of the outer cover.

15. The roof antenna of claim 13, wherein the seal is an O-ring seal.

16. The roof antenna of claim 6, further comprising a seal integrally formed by the outer cover and/or the inner cover.

* * * * *